United States Patent
Crowley et al.

[11] Patent Number: 6,081,590
[45] Date of Patent: Jun. 27, 2000

[54] CALL TREATMENT IN PORTABLE NUMBER NETWORKS

[75] Inventors: Joseph L. Crowley, Holmdel; Garry D. Nelson, Middletown; Richard S. Wetmore, Holmdel, all of N.J.

[73] Assignee: Lucent Technologies Inc., Murray Hill, N.J.

[21] Appl. No.: 09/017,651

[22] Filed: Feb. 2, 1998

[51] Int. Cl.[7] .................................................. H04M 3/42
[52] U.S. Cl. ........................... 379/211; 379/207; 379/220
[58] Field of Search .................................... 379/207, 201, 379/211, 212, 220, 221

[56] References Cited

U.S. PATENT DOCUMENTS

| | | | |
|---|---|---|---|
| 5,703,939 | 12/1997 | Bushnell | 379/211 X |
| 5,881,137 | 3/1999 | Ginzboorg et al. | 379/134 X |
| 5,896,447 | 4/1999 | Bunge et al. | 379/211 |
| 5,949,865 | 9/1999 | Fusinato | 379/207 |
| 5,953,663 | 9/1999 | Maupin et al. | 379/207 X |

*Primary Examiner*—Creighton Smith
*Attorney, Agent, or Firm*—William Ryan

[57] ABSTRACT

A method for implementing call-gapping controls in a telecommunications system supporting ported directory numbers comprises receiving control messages at switches and other network elements, which messages include information relating to the type of controls and parameter information for one or more options permitting present or downstream local number portability (LNP) queries. Based on such received control information, a switch or other network entity seeks to process the call toward completion using dialed number and/or corresponding LNP information, or cancel the call in the interest of overall network efficiency. Use of traffic information allows system operators and network databases to impose policies and practices such as use of dialed number for routing notwithstanding the availability of location routing number information.

34 Claims, 3 Drawing Sheets

CALL TREATMENT IN PORTABLE NUMBER NETWORKS

FIELD OF THE INVENTION

The present invention relates generally to the field of telecommunications systems and methods. More particularly, the present invention relates, in one aspect, to call control treatment systems and methods in telecommunications networks. Still more particularly, aspects of the present invention relate to systems and methods for introducing call controls in telecommunications networks employing local number portability.

BACKGROUND OF THE INVENTION

Local Number Portability (LNP) is a network capability that allows a subscriber of a telecommunications service provider (a user) connected to the public switched telephone network (PSTN) through a particular service provider to move to a different service provider while retaining his or her public directory number. Such change of service provider will at some time likely result in the user's telephone appearance on the network moving to a different switching system. Such change to a different switching system can happen at the time of change of service provider or at some other time. In moving to a different service provider, the user becomes a ported subscriber. Other network users can connect to the ported subscriber without any changes to their dialing procedures.

Telephone numbers in the pre-LNP environment are assigned to local telephone end offices on the basis of geography (the numbering plan area designation, or NPA) and office exchange number, NXX. Thus a telephone number takes the form of an NPA-NXX office designation and a four-digit line number sequence, or NPA-NXX-XXXX. Each XXXX represents one of 10,000 different customer telephone numbers. In effect, the dialed NPA-NXX is the terminating switch's (pre-LNP) routing address for the rest of the network. Thus a pre-LNP telephone number serves two functions: identifying the customer, and providing the network with information needed to route a call to the customer. Upon introduction of LNP, these two functions are separated.

A basic approach that has been adopted for implementing LNP is known as location routing number (LRN) architecture. The LRN architecture uses a unique 10-digit location routing number to identify each switch in the network for call-routing purposes. As in the familiar 800/888 (or, more generally, 8xx) toll-free calling service, an LNP database is used to store routing information, but the LNP database stores routing information for telephone numbers of subscribers who have selected another local service provider, and have been moved to that provider's switching system. Thus, the LNP database contains the directory numbers of all ported subscribers and the location routing number of the switch now serving each of these numbers. LNP requires that end-office switching systems be able to determine whether a dialed NPA-NXX is included in the portability environment. In making this determination, switching systems typically set triggers to occur based on detection of a dialed number including an NPA-NXX for which portability is available. Usually, only one customer's line need be ported for the trigger to be active for all XXXX associated with that NPA-NXX.

These triggers are designed to give rise to a query to the LNP database to retrieve the LRN of the dialed number. The LNP database is typically accessed for such queries from switches using advanced intelligent network (AIN 0.1) telecommunications call processing capabilities and signaling protocols such as transaction control application part (TCAP) intelligent network protocols. That is, queries from switches to an LNP database, and responses from the LNP database, are advantageously communicated using standard common channel signaling messages.

A response to a query from a local switch for location routing information includes the LRN for the switch to which the portable customer has been ported. This LNP approach for ported numbers uses the location routing number returned from the LNP database to route the call to a destination switch, and uses the dialed number to complete the call at the terminating switch. Alternatively, if the call is destined to a number that has not been ported, the response to a database query will simply indicate that the dialed NPA-NXX-XXXX number (the dialed number or DN) should be used for routing purposes.

The LRN data retrieved from the database is advantageously placed in a "called party number" (CdPN) field, while the dialed called-party number is placed in the so-called generic address parameter (GAP) field of the call "set up" message used to transport the call across the network. As previously noted, switches use the LRN to route the call to the terminating switch. At the terminating switch, the LRN received in the called-party number field is compared with its own LRN. When these numbers match, the terminating switch uses the called-party number from the GAP field of the signaling message to complete the call to the subscriber.

Carriers will provide LNP via a system of multiple, regional databases. Such regional databases reduce capacity concerns that would be encountered with a single national LNP database and reduce the distance over which routing information need be sent. Some carriers will use their own database systems for providing LRN information, so a number portability administration center (NPAC) has been agreed upon to provide updates when end users change terminating office connections, typically when these users are moved from one local service provider's switching system to another local service provider's switching system.

It has long been a practice in administering telecommunications networks to provide selective call blocking or call-gapping treatment to calls to a particular telephone number or group of numbers. For example, such call-gapping techniques are sometimes applied to call-in numbers for radio or TV call-in shows that experience a concentrated volume of calling in response to contest offers or celebrity appearances. Other cases suitable for use of call gapping arise when fires, severe weather or other crisis conditions impose great demands on a communications network for calls originating and/or terminating at a particular switch or in a particular geographical region.

In modern networks one typical response to call overloads is to have traffic-sensitive controls imposed by messages sent from a network management control center or similar network facility to individual switches. Such a network management control center may include an administrative control station receiving traffic monitoring data, which data can be acted on by a control center operator. For example, a network management control center operator receiving information about unusual calling volumes to a particular number, group of numbers or switching location can cause a control instruction to be sent to selected switches, or all switches, in the network to block or otherwise inhibit additional traffic destined for the overloaded switch or group of switches. Controlling the rate at which calls to one or more designated location(s) are allowed to enter the network is often referred to as "call-gapping." Such call gapping introduces call treatment which restrains the number of calls that can be sent from one or more switches (or all switches) in a network to designated locations during a period of time.

As an example, call treatment imposed by network administration personnel in the face of unusually high calling volume to a particular switch may be applied to all switches in the network. The call treatment imposed on network switches may, for example, be such that originating volume directed to the high-volume switch (or number or group of numbers) may be limited to a defined number of calls per unit time (e.g., seconds or minutes). While actions taken will vary, e.g., depending on the call treatment options available, the person or mechanism sending a control instruction, may designate that blocked calls receive either an "all circuits busy" announcement, or a busy signal.

In the context of LNP, such call-gapping techniques face a new obstacle. Thus, for example, gapping of calls directed to a group of numbers, such as for all XXXX line numbers in a particular NPA-NXX 6-digit office number, might include 10-digit numbers that are no longer terminated by the volume-affected switch. Accordingly, calls to ported numbers can experience call gapping when no reason for such call treatment exists.

One approach to mitigating such inappropriate call-gapping is treated in co-pending application by Bunge, et al, Ser. No. 08/733376, entitled "Method for Accommodating Ported Directory Numbers Affected by Call Block Controls Implemented in a Telecommunications Network," filed Oct. 17, 1996 and assigned to the assignee of the present application. This application by Bunge, et al, is hereby incorporated by reference in the present application as if set forth in its entirety herein.

In an embodiment disclosed in that application, switches in the telecommunications system are initialized with a call blocking control which uses an originating switch's query of a number portability database prior to processing calls. As a result, LRN data associated with ported directory numbers is retrieved and analyzed to determine whether the ported directory number is actually subject to the initialized call blocking control. Advantageously, if the ported directory number is associated with LRN data indicating that it is not subject to the call blocking control, the call directed to the ported directory number is exempted, and processed without call blocking controls. In certain cases, use of the Bunge, et al approach can result in LNP queries even when the result is highly predictable in light of other extrinsic information. Such call treatment after LNP data is retrieved can sometimes impose a burden on the LNP database and the signaling network used to access the LRN database.

In addition to the manual imposition of call controls by call control messages sent from network management personnel to switches, it is well known in the art to use network databases, e.g., service control points or SCPs to automatically send such messages. In particular, these call treatment messages can be associated with messages sent in response to queries from a switch for database information, e.g., 8xx-to-POTS (Plain Old Telephone Service) number translation information. Such call treatment information and direction to be imposed by SCP messages in some cases is formed at a service management system (SMS) associated with one or more SCPs, and passed to the SCPs for use in responding to subsequent queries. As can be readily seen, LNP introduces an additional degree of complexity in accurately and efficiently imposing such automatic call controls. Thus, 8xx or other traditional routing information supplied by an SCP may include POTS numbers or other destination information for numbers which may have been ported. Likewise, when particular 6- or 10-digit numbers are dialed in high volume, e.g., for a call-in show, then associated LNP databases also experience high volume.

SUMMARY OF THE INVENTION

Limitations of the prior art are overcome and a technical advance is made in accordance with the present invention, as described in illustrative embodiments herein.

In one illustrative embodiment, network management personnel apply call controls in a flexible manner to reduce LNP database queries at an early point in call processing. Advantageously, in specifying call controls, options are selectively reserved that permit LNP queries at one or more points during call handling.

More specifically, in accordance with one illustrative embodiment of the present invention, it proves advantageous in some circumstances to skip an initial LNP query and route a call, at least initially, on the dialed number (DN). Then, depending on the call control measures imposed automatically or by network management personnel, particular calls or classes of calls continue routing based on the DN. In some cases, this routing on DN will continue until the call is completed or blocked (or accorded some other final treatment).

In other cases the call control conditions specified manually or by a network database cause an access to be made to an LNP database to obtain portability routing information for use in subsequent call handling. An originating switch can make this LNP database query, or it can be the made by a subsequent switch to which the call is handed off based on a dialed number.

In some embodiments traditional blocking or gapping of controlled calls (routing using LRN information) is advantageously replaced or augmented with routing of otherwise blocked calls using the dialed number for routing. Then, as the call progresses through further routing, permissions for subsequent LNP queries are used to either continue use of the DN or to use LRN information obtained by such subsequent LNP query.

Whereas prior LNP call treatment adopted LRN information for routing and call control purposes when it was available, a useful alternative in accordance with aspects of the present invention is to not use LRN information in all cases, even when it is available. That is, use of dialed number information can be used to advantage for full or partial routing and call control, even when LRN information is known at a switch or available upon query to a LNP database. Such routing and call treatment based on dialed number can, in accordance with aspects of the present invention also be used when a network database, e.g., an 8xx SCP, provides a POTS number or other equivalent number.

The above-identified alternative illustrative embodiments of the present invention can also be advantageously extended and applied to other particular call treatment scenarios. Thus, for example, n-digit call blocking and call gapping (where n is any number of digits used for identifying a call destination) can be treated in the same or similar manner.

BRIEF DESCRIPTION OF THE DRAWINGS

The above-summarized illustrative embodiments of the present invention will be more fully understood in light of the following detailed description and the included drawing, in which.

DETAILED DESCRIPTION OF THE INVENTION

Figure 1:
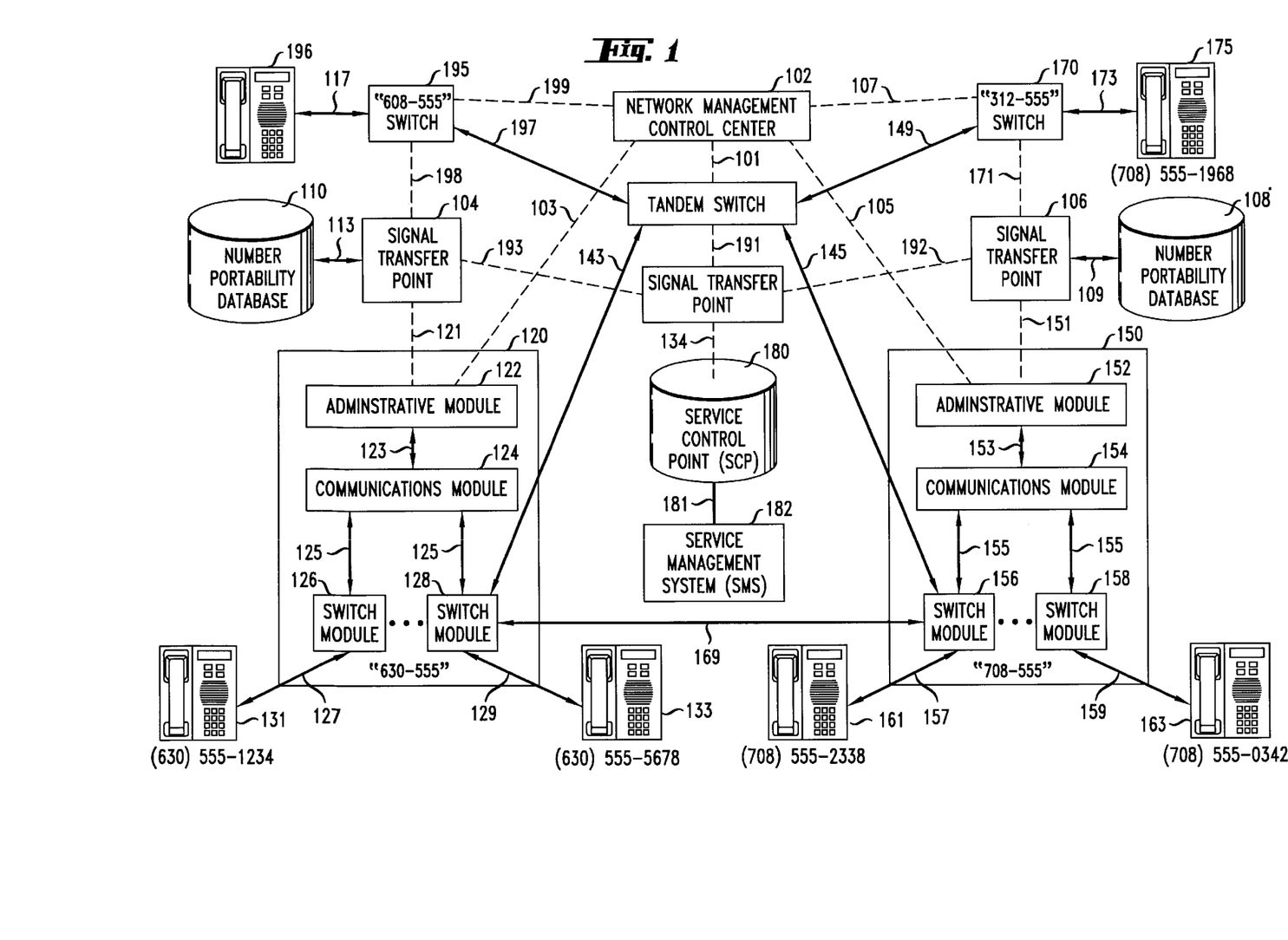
FIG. 1 is a block diagram of a telecommunications network in which an illustrative embodiment of the present invention may be practiced.

FIG. 1 shows a simplified block diagram of a telecommunications system in which illustrative embodiments of the methods of the present invention may be practiced. It is assumed that at least some of the switches and other network elements in the telecommunications system of FIG. 1 support number portability. Each network switch is identified by a unique NPA-NXX. Each such NPA-NXX can have up to 10,000 directory numbers associated with it, i.e., up to 10,000 different NPA-NXX-XXXX. In addition to using NPA-NXX to identify a group of directory numbers, such groups can be identified by 7-, 8- or 9-digit numbers, i.e., by NPA-NXX-X, NPA-NXX-XX OR NPA-NXX-XXX. An individual directory number is, of course, identified by a particular NPA-NXX-XXXX. LNP additionally requires that each switch have a unique identifier, i.e., a unique 10-digit LRN code. It proves convenient in assigning the LRN for a particular switch to base the choice on the NPA-NXX or the NPA-NXX and one or more additional digits, i.e., NPA-NXX-X, NPA-NXX-XX, etc.

Telecommunications system 100 of FIG. 1 comprises for illustrative purposes: network management control center 102; signal transfer points 104, 106 and 190; number portability data bases 108 and 110; central office switches 120, 150, 170 and 195; and tandem switch 140.

Network management control center 102 monitors telecommunications system 100, and is interconnected to central office switches 120, 150, 170 and 195 via links 103, 105, 107 and 199, respectively. Signal transfer points (STPs) 104, 106 are interconnected to each other (illustratively through signal transfer point 190 and interconnecting signaling links 192 and 193) and to respective number portability data bases 110 and 108. STPs 104 and 106 are also connected to each switch in telecommunications system 100, via signaling links and intermediate STP 190. More particularly, signal transfer point 104 is interconnected to number portability database 110, and central office switch 120 via signaling links 113 and 121, respectively. STP 104 is also connected to tandem switch 140 via signaling links 193 and 191, and intermediate STP 190. STP 104 is connected to switch 195 via signaling link 198. Similarly, signal transfer point 106 is interconnected to number portability database 108 via signaling link 109 and to central office switch 150 via signaling link 151. STP 106 is also connected to switch 170 via signaling link 171 and tandem switch 140 via signaling links 192 and 191 via intermediate STP 190.

Also shown connected to STP 190 in FIG. 1 is service control point (SCP) 180 and its associated service management system (SMS) 182. SCP 180 is representative of network databases for supplying routing and other control information for database-based services such as calling card, 8xx, 900, virtual private networks and other intelligent network or Advanced Intelligent Network (AIN) services. Queries launched by switches and other network elements arrive at SCP 180 seeking additional information needed to process this class of calls. Messages are typically received at SCP 180 via signaling link 134 in SS7 TCAP common channel signaling format and result in access to the network database located at the SCP. Upon retrieval of needed information, the SCP then sends one or more messages to the querying network element or other network elements to further process the call. Among the capabilities of modern SCP databases is call treatment in light of congestion or other overload, e.g., call blocking or call gapping. U.S. Pat. No. 4,191,860 issued Mar. 4, 1980 to Roy P. Weber provides a discussion of call blocking using traffic information available at a network database when, for example, a particular number is very frequently called in a short period of time. Service management system (SMS) 182 is commonly used in conjunction with network databases, e.g., for service creation and provisioning, and can be used to modify call treatment policies and practice for particular numbers, groups of numbers and NPA-NXX numbers.

Telecommunications system 100 depicted in FIG. 1 is only a representative portion of the public-switched telephone network (PSTN). Those skilled in the art will recognize that many other switches and interconnected STPs are present in the complete PSTN. Likewise, the number portability databases 108 and 110 shown in FIG. 1 are merely representative of the several regional number portability databases containing Location Routing Number (LRN) information for ported telephone numbers.

In the illustrative network shown in FIG. 1, central office switch 120 is interconnected to tandem switch 140 via bi-directional trunk 143, and is interconnected to central office switch 150 via established bi-directional trunk 169. Tandem switch 140 is interconnected to central office switches 150, 170 and 195 via established bi-directional trunks 145, 149 and 197, respectively. While the foregoing trunk interconnections are stated in terms of trunks, it will be appreciated by those skilled in the art that such interconnections may include one or more trunk groups, as traffic demands dictate.

Figure 2:
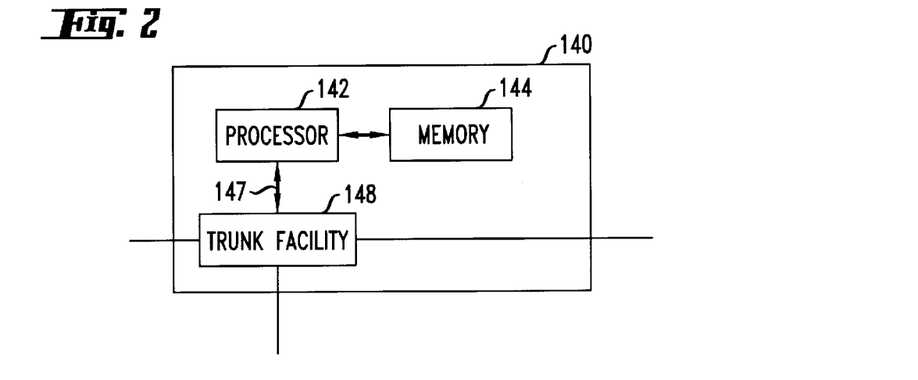
FIG. 2 is a more detailed block diagram representation of the tandem switch 140 shown in FIG. 1.

While each of the central office switches shown in FIG. 1 has a unique NPA-NXX designation, tandem switch 140 does not serve individual customer lines, and is not identified by such an NPA-NXX code. Tandem switch 140 acts as a gateway switch to other switches within representative telecommunications system 100, and the PSTN generally. Illustrative tandem switch 140 is shown in more detail in FIG. 2 as comprising main processor 142 interconnected to trunking facility 148 via data link 147. Also shown is memory 144 for storing control information and processes, including call control information. Such call control information will include call treatment information received from network management control center 102, derived at switch 140 based on locally observed traffic activity, or received from other network elements. Tandem switch 140 will act on such call control information to impose call treatments needed to selectively inhibit calls for identified destinations.

Figure 3:
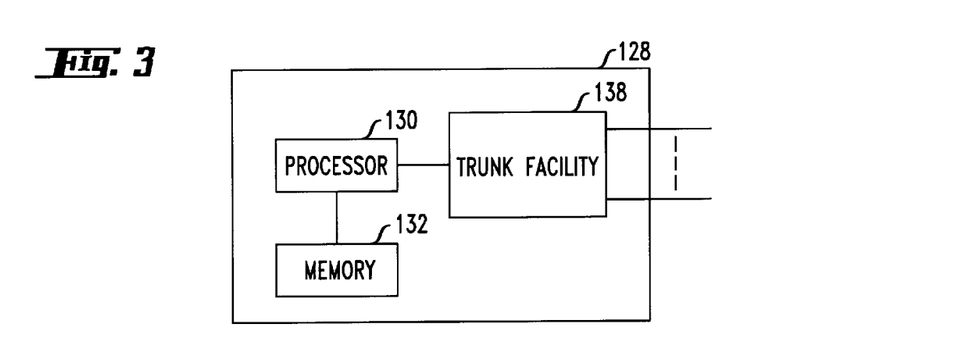
FIG. 3 is a more detailed block diagram representation of switch modules of the type illustratively shown as included in switches such as 120 and 150 in FIG. 1.

In an illustrative system embodiment, central office switches 120, 150, 170 and 195 are 5ESS® switches manufactured, and sold by Lucent Technologies Inc. Central office switch 120 is identified by NPA-NXX digits "630-555," and comprises administrative module 122 interconnected to communications module 124 via communications link 123. Communications module 124 is interconnected to switch modules 126 and 128 via data links 125. In operation, switch modules 126 and 128 each serve a plurality of customer lines that terminate at customer premises equipment. In the illustrative embodiment of FIG. 1, a single customer line per switch module is depicted for simplicity of representation. Each switch module stores customer data, and establishes calls for the customer lines that it serves. Representative switch module 128 is shown in FIG. 3 to include processor 130 and data memory 132. Switch module 128 in FIG. 3 also includes trunk facility 138 for interconnecting the central office switch to the rest of the PSTN. Other switch modules, such as switch module 126 in switch 120 and switch modules 156 and 158 in switch 150, also include processors and memory as in FIG. 3, and at least some of the switch modules in each switch also include trunk facilities such as 138 in FIG. 3, all as is well known in the art.

In the system shown in FIG. 1, switch module 126 serves customer line 127 terminating at telephone 131 identified by directory number 630-555-1234. Switch module 128 serves customer line 129 which terminates at a telephone 133, and is identified by directory number 630-555-5678.

Central office switch 150 is identified by NPA-NXX digits "708-555", and includes components similar to the components in central office switch 120. In particular, central office switch 150 includes administrative module 152 interconnected to communications module 154 via communications link 153. Communications module 154 is interconnected to typical switch modules 156 and 158 via data links 155. Switch module 156 includes a processor such as 130 in FIG. 3, data memory of the type shown in FIG. 3 by memory 132, and trunk facility of the type shown in FIG. 3 by trunk facility 138. In the embodiment shown, switch module 156 serves customer line 157 which terminates at telephone 161 identified by directory number 708-555-2338. Switch module 158 comprises a processor of the type shown in FIG. 3 by processor 130 and a data memory of the type indicated in FIG. 3 by memory 132. In this example, switch module 158 serves customer line 159 terminating at telephone 163 identified by directory number 708-555-0342.

NPA-NXX digits 312-555 identify central office switch 170 while NPA-NXX digits 608-555 identify central office switch 195. The components of central office switches 170 and 195 are substantially identical to those of central office switches 120 and 150, excepting only adjustments for capacity and the like. Switch 195 is included, in part, to represent other switches in the PSTN.

For purposes of explanation of an illustrative embodiment of the present invention, it is useful to note that central office switch 170 serves customer line 173, which terminates at telephone 175 identified by directory number 708-555-1968. The directory number associated with telephone 175 does not match the NPA-NXX digits identifying central office switch 170. This occurs when a subscriber such as that served by customer line 173 has ported a directory number from central office switch 150 to central office switch 170.

During normal operation of telecommunications system 100, substantially all calls placed between customers served by central office switches 120, 150, 170, and other switches within the PSTN are completed. In some circumstances, however, it is necessary to decrease the call volume directed to a particular destination. For purposes of example, assume that natural disaster strikes the geographic area served by central office switch 150. As a result, concerned parties wishing to contact friends and relatives in the affected area place calls directed to central office switch 150. Simultaneously, those parties served by central office switch 150 may attempt to place outgoing calls to the concerned parties. To optimize switch resources for completing as many calls as possible, network management personnel institute a call blocking control directed to relieving demand on resources at central office switch 150. In alternative embodiments, call-blocking controls can be activated for other destinations, such as a plurality of central office switches or a particular directory number.

In the current example, the call blocking control is intended to limit the number of telephone calls that are directed to central office switch 150. More particularly, assume that network management personnel want to allow only ten calls per minute originating at switches 120, 170 and 195 to terminate to a customer line on central office switch 150. During normal operation (that is, without call blocking controls), the call origination rate at switches 120, 170 and 195 for calls directed to switch 150 may be as high as 50 calls per minute, or more. The requirements of the call blocking control are advantageously formulated in network management control center 102, and downloaded to all affected switches in telecommunications system 100 via datalinks 101, 103, 105, 107 and 199. In the illustrative embodiment, the call blocking control accommodates ported directory numbers, as described below. Once received at a central office switch, the call blocking control is stored, e.g., in respective switch module memories 132. In tandem switches, such as tandem switch 140 in FIG. 1, the call blocking control is stored in illustrative data memory 144. The central office switch which is experiencing overload or other difficulty (in this case, central office switch 150) also may receive the call blocking control, but may receive a different control (such as, allowing a given number of calls per unit time to originate from its customer lines). Call blocking controls can significantly decrease call volumes destined for a central office switch, such as the assumedly overloaded switch 150.

In an example described in the above-cited Bunge, et al, patent application, the call blocking control implemented by network control center 102 identifies calls to be blocked by NPA-NXX digits "708-555." Accordingly, absent any further call treatment, all calls originating in telecommunications system 100 (and illustratively at least selected other parts of the PSTN) including dialed NPA-NXX digits "708-555" are subject to the call blocking control. However, there is a subscriber served by central office switch 170 (a non-call-controlled central office switch) having a directory number comprising NPA-NXX digits "708-555". Although central office switch 170 is not subject to blocking (since it is not identified by NPA-NXX digits "708-555") it does serve at least one ported directory number customer having a directory number including digits "708-555" (that is, the customer served by customer line 173 having a number 708-555-1968). Therefore, again absent any further call treatment, call blocking controls which block calls destined for directory numbers beginning with NPA-NXX digits "708-555" result in blocking calls to ported directory number 708-555-1968 served by central office switch 170. The Bunge, et al application describes, inter alia, a method for relieving blocking for numbers which have been ported from a switch for which call blocking has been applied. Briefly, in accordance with an aspect of the Bunge disclosure, a query is originated to determine if the dialed number has been ported from the blocking-affected switch to a switch for which no blocking controls apply. If such porting is found, then the controls can be ignored for calls to the ported number.

Modified Call Treatment

Figure 4:
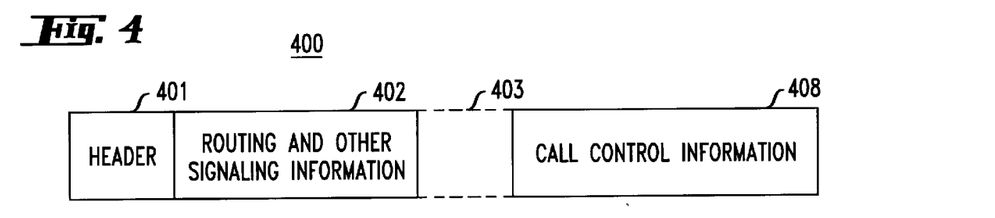
FIG. 4 is a representation of a message including one or more call control fields that may be received by a switch or other network element as part of a process to control calls.

Additional call treatments useful in the context of local number portability in accordance with aspects of the present invention will now be described. In this regard, FIG. 4 shows a representative message format for messages delivered to switches or other network elements for purposes of call control in the face of local or area-wide congestion of the types described above. These messages may be of the format of SS7 messages or other signaling system messages, or they may be uniquely associated with network management control functions. That is, representative links 101, 103, 105, 107 and 199 may advantageously be dedicated or dialed links outside of the signaling system used for normal call handling.

In any event, the representative message format 400 shown in FIG. 4 includes header information in field 401 reflecting the destination and other identification information for the message. This representative message may also include routing information and general signaling information in field 402. In one example, a message 400 from an LNP database, such as 110 in FIG. 1, illustratively includes LRN portability data in the field shown as 402 in FIG. 4. Additionally, however, the message 400 of FIG. 4 includes call control information, such as call treatments to be accorded calls to or from identified network elements. Field 408 in FIG. 4 reflects this latter information. Other fields, represented by 403 in FIG. 4, may be included to supplement the information in fields 401, 402 and 408.

Figure 5:
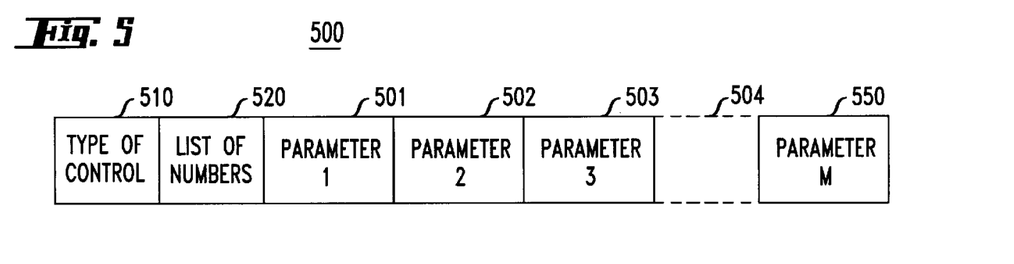
FIG. 5 is a representation of illustrative call control information fields included in a message of the type shown in FIG. 4 in accordance with one aspect of the present invention.

FIG. 5 shows in more detail a format for illustrative call control information field 408 for use in introducing efficient and more flexible call treatment methods. Specifically, call control field 408 is seen to include a control type field 510, controlled number list 520 and several parameter fields 501, 502, . . . , 550, corresponding to parameter 1 through parameter M. Control type field 510 illustratively contains information including, in appropriate cases, the source of the control message, e.g., a manual control from network management control center 102. The field 510 also typically includes quantitative options for the extent of the control, e.g., maximum number of call originations per unit time to the controlled number(s). Field 520 illustratively represents the list of controlled numbers, e.g., the 6-digit or 10-digit groups of numbers, or other number(s), subject to controls. Parameter fields PARAMETER 1 through PARAMETER M will be present, or not, depending on the types of controls sought to be imposed on the controlled number(s), as will be seen below.

Controls imposed by messages of the types shown in FIGS. 4 and 5 may be sent from network management control center 102 or similar facility (manual controls), or they may originate at a network database such as number portability databases 108 or 110, or SCP 180 (automatic controls). Automatic call control messages sent from a network database may include different fields, or a different number of fields, than manual call control messages originating from network management control center 102 or similar network facility. This allows for human judgements to be manually imposed in messages from network management control center 102, e.g., based on past experiences or a subjective evaluation of developing events in the network. As one illustrative scenario, the basic controls to be imposed on selected switches may be determined by the network management control center and specified in a manual message to the affected switches. Such controls might include the nature of the controls (e.g., gapping or blocking), the quantitative level of control (e.g., gapping at a rate of 10 originations per minute), and the affected numbers (e.g., all numbers in a particular NPA-NXX). Call control number lists, sometimes referred to as Call Gapping Lists or CGLs can be 6-digit CGLs or 10-digit CGLs, or any other meaningful type of CGL. Subsequent messages from a network database might then augment or otherwise modify the affected numbers, as by adding an additional NPA-NXX. Such modifications or augmentations of the list of affected numbers typically correspond to changes to the status of the network. For example, an additional switch may experience overload, or demands on network databases may be experiencing actual or anticipated demand overloads.

Figure 6:
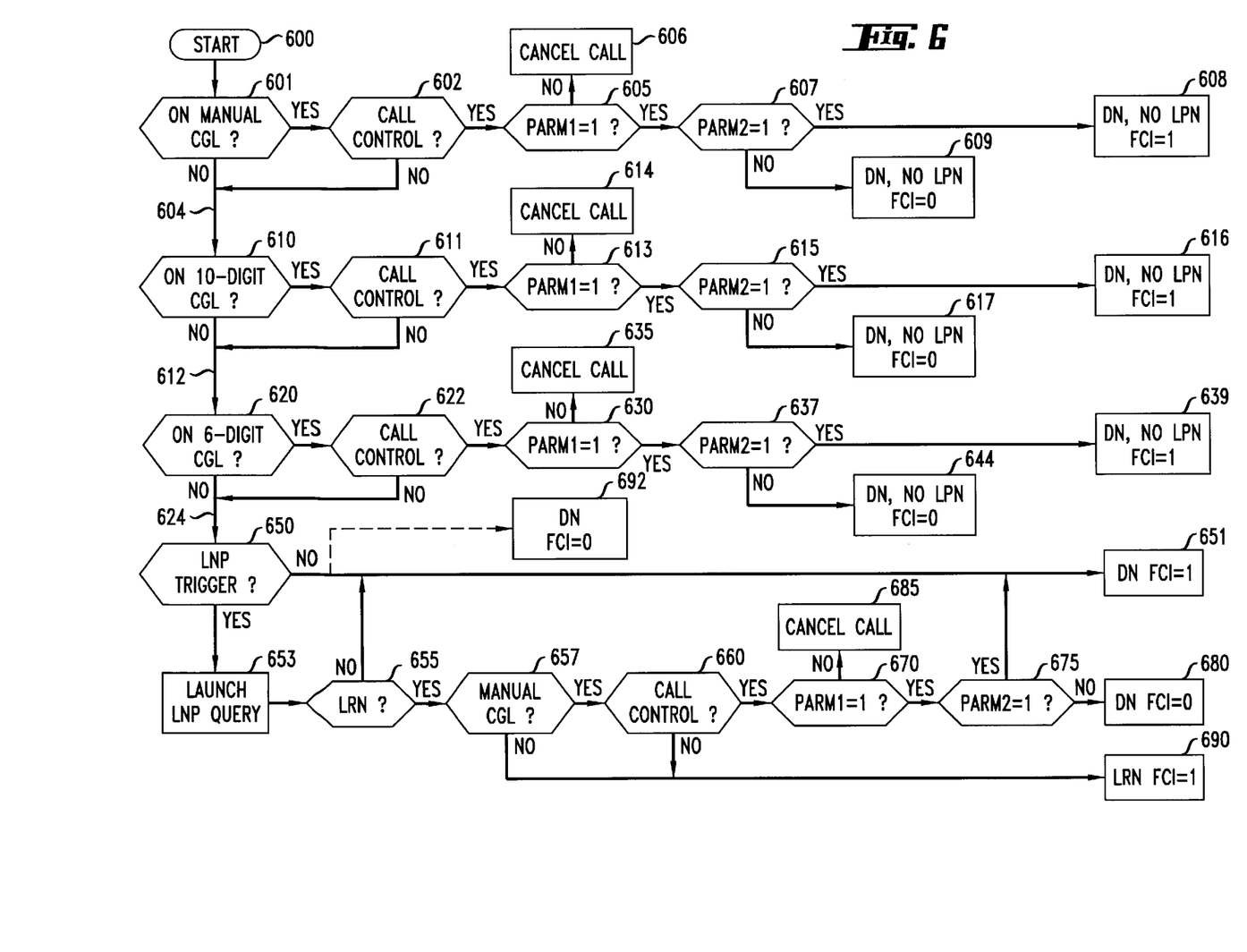
FIG. 6 is a flow diagram illustrating steps performed in the telecommunications network of FIG. 1, in accordance with aspects of illustrative embodiments of the present invention.

Reference to FIG. 6 will provide additional understanding of illustrative applications of the call controls implemented in accordance with the present inventive principles. Upon receipt of the illustrative call control message 408 in FIG. 5, the switch or other network element stores the call control information in memory, e.g., 144 of FIG. 2 or 132 of FIG. 3. FIG. 6 summarizes a process for evaluating such call control information and applying it to the routing and control of calls presented at network elements. In particular, FIG. 6 tracks illustrative call treatment and routing steps for a typical call arriving at a switch, such as switch 120 in FIG. 1. It is assumed that call controls have been placed on the switch by way of either or both of manual messages from network management control center 102 or similar facility, or automatic messages from a network database or other network element. When the switch is an originating switch, the call information resulting from placing the call initially includes the dialed number (DN), but no portability information.

Start 600 in FIG. 6 corresponds to the receipt of a call, e.g., by receipt of a DN at an originating switch. As indicated in test block 601, a first test is conveniently made to see if the DN appears on the list of numbers imposed by a manual control. For simplicity of reference, this test is referred to in FIG. 6 as a test for the appearance of the DN on the manual call gap list, or ON MANUAL CGL. A positive or yes result of this test causes a further test to be made at test block 602, styled CALL CONTROL. If the answer at test block 601 is negative or no, then processing continues by way of node 604 to a test at block 610.

The CALL CONTROL reference at block 602 (and elsewhere in FIG. 6) is to a test for the status of execution of call controls previously imposed, e.g., whether the rate of allowed originations to a controlled number or set of number has been exceeded for the current time interval. If the allowed rate of calls per minute was set at 10, and only 8 calls have been processed so far in the current minute, then the answer to the test in block 602 would be no. Processing would then pass to node 604 leading to test block 610. Other particular execution status determinations can be made in a CALL CONTROL test block, depending on the nature of the control(s) imposed.

If the test at CALL CONTROL block 602 is positive, then processing continues to test block 605, styled PARM1=1. PARM1 is used in FIG. 6 as a shorthand reference to the value of a parameter of the type shown in FIG. 5 by the field PARAMETER 1 identified by the reference numeral 501. Likewise, PARM2 is used in FIG. 6 to refer to the value of a second parameter, viz., PARAMETER 2 shown by the field 502 in FIG. 5.

PARM1 is conveniently chosen as a means for imposing a useful option in processing calls at a network element subject to call control. In particular, PARM1 is used to specify by a value of 0 (i.e., the result of a test for PARM1=1 is negative) that the current call should be canceled or accorded final treatment other than further processing toward completion. For ease of discussion, final treatment other than further processing toward completion (busy, recorded announcement, etc.) will be referred to as canceled. Thus, in FIG. 6 when a negative result of the PARM1=1 test is determined at block 605, the call is canceled.

A positive result of the test for PARM1=1 at test block 605, however, leads to a further test at block 607 for PARM2=1. PARM2 is advantageously used to set the condition of a flag or other indication to network elements, such as switches, that handle the current call after the present network element, illustratively originating switch 120 in FIG. 1, has completed processing of the call. Thus, if the test for PARM2=1 at test block 607 is positive, then call control routing options are specified by the block 608 in FIG. 6. In particular, the call is routed on the dialed number (represented by the DN appearing in block 608 in FIG. 6) and the value for the Forward Call Indicator LNP parameter (FCI LNP flag) is set to 1. Additionally, no current query is launched to the LNP database, such as 108 in FIG. 1. This latter direction is reflected by the NO LNP reference in block 608. While the Forward Call Indicator field may include other flags or bit patterns, the current discussion will be limited to the FCI LNP flag.

More generally, the FCI LNP flag is conveniently used to reflect permission to the following network element (e.g., a subsequent switch handling the call) regarding querying the LNP database. Thus, if the FCI LNP flag is set to 1, a following network element receiving the call from the current network element is not empowered to make a query to the LNP database. That is, the current network element, switch 120 in the present example, does not give permission to the subsequent network element to make database queries to obtain LRN information for the present call.

If a negative result is obtained for the PARM2=1 test in FIG. 6 at block 607 the result reflected in block 609 obtains, viz., route on DN, do not make a current reference to the LNP database, and set the FCI LNP flag to a value of 0 when handing the call to the next network element. A value for the FCI LNP flat of 0 conveniently reflects no withholding of permission to the subsequent network element regarding performing a LNP database query.

Returning to FIG. 6 at node 604, a point in processing obtained when the test at 601 is negative, or when the test at 601 is positive, but the test at 602 is negative, we encounter a test 610 regarding whether the current DN is on the automatic 10-digit call gap list at the example switch 120. Again, a negative result of the test at block 610 causes processing to pass to other possible control mechanisms, such as automatic 6-digit controls. If a positive result is obtained upon the test at block 610, the CALL CONTROL, PARM1=1 and PARM2=1 tests at blocks 611, 613 and 615 are performed. Of course if the PARM1=1 test results in a negative result, the PARM2=1 test need not be performed. In any event, the possible results from the determination that the current DN is on the automatic 10-digit CGL at illustrative switch 120 appear in blocks 614, 616, and 617. The result represented at block 614 is again that the call be canceled. Blocks 616 and 617 reflect similar results to each other, except that in the case of block 616 the FCI LNP flag is set to 1, while at 617 the flag is set to 0.

When processing at block 611 and/or 610 yields a negative result, the test is made at block 620 for the presence of the current dialed number on an automatic 6-digit CGL in example switch 120. If the DN is found on the automatic 6-digit CGL list, then processing proceeds by way of blocks 622, 630 and 637 to one of the result blocks 635, 639 or 644. The recitations in these latter blocks reflects the same results as in the cases just described flowing from a positive result of processing at 601 and 610 to one of the results appearing at the right of FIG. 6.

Finally, when processing by way of 601, 610 and 620 leads to decision block 650, a somewhat different course of processing ensues. In particular, at block 650 a test is made for the existence of a LNP trigger, e.g., a test for whether the NPA-NXX for the current DN refers to an office which has at least one ported number. When the result of this test is negative, routing is typically accomplished based on the DN, no LNP database query is launched, and FCI LNP flag is set to a value of 1. However, a service provider can cause a negative result of testing at block 650 to set the FCI LNP flag to a value of 0. This alternative is shown in dotted line connection from the negative output of the test at block 650 to block 692. When the test for the presence of an LNP trigger at block 650 yields a positive result, however, a query to the LNP database is launched, as indicated at block 653 in FIG. 6.

After the response to the LNP query is received, the current network entity, e.g., the example switch 120, examines the response to determine if it contains a location routing number or LRN. If a LRN is found, then the subscriber with the current DN has been ported to a different terminating switch. The test for the presence of a LRN is indicated at block 655. When the result of the test at block 655 is negative (no porting), then the call is routed on DN. Additionally, the FCI LNP flag is set to 1 to indicate to subsequent switches that a LNP query has been made and that the subsequent switch does not have to re-query the LNP database.

If the test at block 655 is positive, a further test is made for the presence of the LRN on the manual CGL at block 657. Upon a negative result, routing proceeds using the LRN with the FCI LNP flag set to 1 as reflected in block 690. If the LRN test result is positive at block 657, then the usual CALL CONTROL test is made at block 660. If the allowed number of calls per unit time (or other status value) is not exceeded, then routing again proceeds as indicated at block 690.

If the call control test 660 yields a positive result, the usual PARM1=1 and PARM2=1 tests are performed (as needed) at blocks 670 and 675. Depending on the results of these tests, one of the call routing and call treatment options provided in blocks 651, 680 or 685 is followed. It should be noted that routing on DN follows in many of the possible outcomes, even though LRN information is obtained via the query launched at block 653.

The result of the processing outlined in FIG. 6 show that advantages can obtain in processing calls subject to call controls when, under appropriate conditions, DN is used to route calls, with or without the availability of LRN information. Thus, for example, by using DN at a present point of processing, database queries can be reduced under a number of conditions. Moreover, when such queries are avoided at a present stage of call processing, such queries can be made at a later stage of processing, e.g., at a switch not subject to the same, or any, call controls.

Through appropriate use of the present inventive teachings, call cancellations can be avoided and more calls can be made without further burdening network databases at times when results are highly predictable. That is, when a database query to the LNP database can be delayed or avoided, there may be a higher probability of call completion and lower burden placed on LNP databases. This result is highly likely when only a few numbers for a particular NPA-NXX have been ported, and when a particular dialed number is not ported. Queries to a LNP database under these circumstances would yield little additional value as compared to the burden placed on LNP databases and other network facilities in times of overload or congestion. Information regarding the degree of porting at a particular NPA-NXX available at network management control centers can be effectively deployed at network elements such as switches through the use of messages containing particular parameter values of the type described above.

Signaling messages used to convey permissions for LNP queries after the first enabled switch are typically standard SS7 ISUP signaling messages, with fields populated in accordance with options selected by the authority imposing the controls. In typical operation, this is accomplished by an operator at the network management control center or its equivalent, or by input at a SMS associated with a SCP. Alternatively, traffic monitoring and tabulating abilities at SCPs and their associated processors can apply particular strategies based on predetermined policies and algorithms triggered by observed traffic patterns. The policies and algorithms thus triggered will cause messages to be formulated for distribution by the SCPs in the manner described above.

While it has proven convenient to describe embodiments of the present invention in terms of actions at an originating switch, no such limitation is essential to the practice of the present invention. As well, the present inventive methods can be applied at tandem or other intermediate switches in a network of interconnected switches and other facilities. Likewise processing of the type described above can be accomplished at network databases, with the results in the form of routing information and FCI flag appearing in messages sent from the network databases to switches or other elements in the network.

While examples and illustrative embodiments of the present invention described above have focused on local number portability of a type in which a subscriber is ported to a different service provider, other types of number portability can be effectively treated by using these call treatment and call processing methods. For example, when a subscriber moves to a different geographic location (one served by a different switch) while remaining a subscriber to the same service provider, the same inventive methods can be applied to advantage. Similarly, the present inventive methods can be used when a subscriber remains a subscriber with the same carrier and remains at the same physical location, but becomes a user of services of particular kinds from another switch of that carrier. Calls involving these particular services may be made subject to the call treatment methodologies described and claimed herein. The presence of one or more triggers or results of tests for call properties can be used to identify calls to which these techniques may be applied.

Advantages resulting from the above-described flexible application of call treatments can be appreciated from a few representative examples. As noted above, a general advantage is that queries to a LNP database can often be avoided in those circumstances in which the likelihood of new information being provided is low. For example, an advantage of setting the FCI flag to 0 while routing initially on DN (no LNP query) is that it allows some calls to be completed when a query to the LNP database would likely face congestion at the SCP or signaling links to the SCP, or elsewhere. A later switch having access to a different SCP or different links might avoid such congestion.

Other pre-query call treatment at a switch, such as setting FCI=1 and routing based on DN, proves advantageous when queries to a LNP database cannot readily be completed (e.g., due to congestion at several LNP SCPs). Then, information otherwise available in a network (e.g., at the network management control center) indicating that a particular DN is not ported can be used to adopt such call treatment and routing.

Other call control blocking or gapping methods and associated systems for practicing such methods, all within the scope of the present invention, will occur to those skilled in the art. While particular parameters have been described for use in the practice of the present invention, other parameters will be found useful in particular cases. Likewise, the manner of introducing the parameters, and of sequencing operations based on them, is merely illustrative. Described combining of parameters and the use of many-valued parameters may also prove useful in many cases. The term "call-gapping" should be understood to include call blocking.

While use of some illustrative embodiments of the present invention contemplate call controls involving call gapping, it will be clear to those skilled in the art that, in appropriate cases, total blocking of calls to and from a particular destination may be implemented using the above-described methods and systems. Likewise, calls from certain locations, or to certain locations within broadly based sets of controlled numbers may be treated differently. That is, parameters relating to these calling or called numbers may obtain greater or lesser testing for matching with control values. Likewise, different parameters (e.g. indicating classes of service, premium rate calls or other traffic indicia) may be used to selectively apply call treatment in conjunction with the control parameters discussed above.

The preceding discussion of call control methods has proceeded in the context of a network under the control of a single service provider. For example, network management control center 102 was shown sending call treatment messages to all or any of switches 120, 150, 170 and 195. However, those skilled in the art will recognize that the present call handling and treatment techniques can be applied in a combined or interconnected network including elements of more than one service provider. More particularly, the present inventive methods can be applied in networks in which a switch in a network of one service provider can be interconnected in various ways with switches in networks of one or more other service providers. As one example, switch 195, LNP database 110 and STP 104 may be part of a network of service provider B, while the remainder of the network shown in FIG. 1 may be part of the network of service provider A. While circumstances may vary, LNP database 110 may be shared between service providers A and B (and others), or it may be uniquely available to switches in service provider B's network. In the latter case, an alternative path to a LNP database will be provided to replace link 121. Appropriate interconnection of signaling links between networks will likewise be made, as is well known in the art.

One advantage of the present inventive methods in the case of interconnected networks of service providers A and B can be appreciated from the following example. It is assumed that switch 1 is in A's network and switch 2 is in B's network, and that network managers in A's network management control center know that the route from switch 1 to switch 2 is in overload condition. Moreover, A's managers have information that a particular DN is that of a high volume customer who was previously homed on switch 3 of C, a third service provider. Because the network managers in A do not know the status of circuits or links between switches of B and C, they deem it inappropriate to cancel a call to this customer having the DN. Thus, even with LRN available and call control active (test at block 660 is positive), A illustratively would route the call based on DN, with the FCI flag set to 0. Then, when B gets the call by handoff from A, it can base its call treatment on knowledge of the status of traffic between the switches in the networks of B and C. On the other hand, if all of the switches are part of the network of the same service provider, the most efficient treatment might be to simply cancel the call.

In adapting the teachings of the present disclosure to networks of different service providers, the availability of information from network management control center information 102 must, of course be considered. That is, service provider B may have a separate network management control center, or its equivalent, and switches in service provider B's network will generally be primarily under the control of that latter center. However, if the methods of the present invention are applied in B's network, then receipt at B's switches of messages of the type described above will provide those switches with data needed to apply call treatments as described above. This will be the case whether calls being processed originated at B's switches or were handed off from A's network (or any other authorized interconnected service provider) with routing and FCI information provided with the call handed off.

While the above-description of illustrative embodiments of the present invention have been based on PSTN applications, those skilled in the art will recognize that the present inventive teachings will apply in private networks, in wireless networks, and in data networks, as well as traditional voice telecommunications networks.

Those skilled in the art will recognize that access by a switch or other network entity to a LNP database may be direct or by way of one or more other network entities, e.g., STPs or other switches.

As used in the present disclosure and claims, all uses and forms of the term comprise is to be attributed the non-exhaustive and non-exclusive sense and meaning of include, and not the sense or meaning of consist of, as for an exhaustively identified set of objects. Thus, e.g., "a system comprising A and B" also refers to the system: A and B and C. As used herein, the term "database" means either a database system or the contents of such a system or both, as the context permits.

What is claimed is:

1. In a telecommunications network comprising a plurality of switches, at least one local number portability (LNP) database accessible by at least some of said switches and signaling links interconnecting entities in said network, said network selectively connecting calls to subscribers subject to any applicable call treatment, said calls being identified by a dialed number (DN), said LNP database storing location routing number (LRN) information for ported subscriber numbers, a method for selectively routing and applying said call treatment to a call being processed at a present network entity, said method comprising the steps of receiving at said present network entity signals identifying at least one set of one or more controlled numbers and at least one set of call treatment conditions for respective ones of said controlled numbers, when said DN is a controlled number and at least one set of call treatment conditions associated with said DN are met at said present network entity, routing said call based on said DN without accessing said local number portability database.

2. The method of claim 1 comprising the further steps of receiving at said present network entity signals identifying the value of a first parameter associated with respective ones of said controlled numbers, and canceling said call whenever said value of said first parameter associated with said DN has a first value.

3. The method of claim 2 comprising the further step of signaling a value for a third parameter to network entities handling said call subsequent to said present network entity whenever said first parameter associated with said DN has a second value.

4. The method of claim 3 comprising the further step of receiving at said present network entity signals identifying the value of a second parameter for at least some respective ones of said controlled numbers, and wherein said signaling a value for a third parameter comprises signaling a first value for said third parameter when said second parameter associated with said DN has a first value, and a second value for said third parameter when said second parameter associated with said DN has a second value.

5. The method of claim 4 wherein said first value for said third parameter indicates that said subsequent entities are denied permission to access said LNP database in processing said call, and said second value for said third parameter indicates that said subsequent entities are not denied permission to access said local number portability database in processing said call.

6. The method of claim 1 wherein said at least one set of controlled numbers are ordered, and determinations of whether said respective call treatment conditions associated with said DN are met are accomplished based on said order of said sets of controlled numbers.

7. The method of claim 6, wherein said sets of controlled numbers comprise at least one set of manually controlled numbers.

8. The method of claim 6, wherein said sets of controlled numbers comprise at least one set of automatically controlled numbers.

9. The method of claim 7, wherein said sets of controlled numbers comprise at least one set of automatically controlled numbers.

10. The method of claim 9, wherein said at least one set of manually controlled numbers is ordered in precedence with respect to said at least one set of automatically controlled numbers.

11. The method of claim 8, wherein said at least one set of automatically controlled numbers comprises a set of 10-digit numbers.

12. The method of claim 8, wherein said at least one set of automatically controlled numbers comprises a set of 6-digit numbers.

13. The method of claim 8, wherein said at least one set of automatically controlled numbers comprises a set of 10-digit numbers and a set of 6-digit numbers, and wherein said set of 10-digit numbers is in ordered precedence with respect to said set of 6-digit numbers.

14. The method of claim 1 wherein said present network entity is a switch.

15. The method of claim 14 wherein said switch is an originating switch receiving said call identified by said DN.

16. The method of claim 1 wherein said present network entity is a network database responding to queries from other network entities.

17. The method of claim 14 wherein said call treatment conditions include exceeding a threshold value for calls per unit time.

18. The method of claim 16 wherein said call treatment conditions include exceeding a threshold value for calls per unit time.

19. The method of claim 14 wherein said call treatment conditions include exceeding a percentage of received calls.

20. The method of claim 16 wherein said call treatment conditions include exceeding a percentage of received calls.

21. In a telecommunications network comprising a plurality of switches, at least one local number portability (LNP) database accessible by at least some of said switches and signaling links interconnecting entities in said network, said network selectively connecting calls to subscribers subject to any applicable call treatment, said calls being identified by a dialed number (DN), said LNP database storing location routing number (LRN) information for ported subscriber numbers, a method for selectively routing and applying said call treatment to a call being processed at a present network entity, said method comprising the steps of receiving at said present network entity signals identifying at least one set of one or more controlled numbers and at least one set of call treatment conditions for respective ones of said controlled numbers, when said DN is not a controlled number, an LRN associated with said DN is available to said present network entity, said LRN is a controlled number and call control conditions associated with said LRN are met, routing said call based on said DN notwithstanding the availability of said LRN.

22. The method of claim 21 comprising the further steps of receiving at said present network entity signals identifying the value of a first parameter associated with respective ones of said controlled numbers, and canceling said call whenever said value of said first parameter associated with said LRN has a first value.

23. The method of claim 21 comprising the further step of signaling a value for a third parameter to network entities handling said call subsequent to said present network entity whenever said first parameter associated with said LRN has a second value.

24. The method of claim 23 comprising the further step of receiving at said present network entity signals identifying the value of a second parameter for at least some respective ones of said controlled numbers, and wherein said signaling a value for a third parameter comprises signaling a first value for said third parameter when said second parameter associated with said LRN has a first value, and a second value for said third parameter when said second parameter associated with said LRN has a second value.

25. The method of claim 24 wherein said first value for said third parameter indicates that said subsequent entities are denied permission to access said LNP database in processing said call, and said second value for said third parameter indicates that said subsequent entities are not denied permission to access said LNP database in processing said call.

26. The method of claim 21 wherein said present network entity is a switch.

27. The method of claim 26 wherein said switch is an originating switch receiving said call identified by said DN.

28. The method of claim 21 wherein said present network entity is a network database responding to queries from other network entities.

29. The method of claim 26 wherein said call treatment conditions include exceeding a threshold value for calls per unit time.

30. The method of claim 28 wherein said call treatment conditions include exceeding a threshold value for calls per unit time.

31. The method of claim 26 wherein said call treatment conditions include exceeding a percentage of received calls.

32. The method of claim 28 wherein said call treatment conditions include exceeding a percentage of received calls.

33. In a telecommunications network comprising a plurality of switches, at least one local number portability (LNP) database accessible by at least some of said switches and signaling links interconnecting entities in said network, said network selectively connecting calls to subscribers subject to any applicable call treatment, said calls being identified by a dialed number (DN), said LNP database storing location routing number (LRN) information for ported subscriber numbers, a method for selectively routing and applying said call treatment to a call being processed at a present network entity, said method comprising the steps of receiving at said present network entity signals identifying at least one set of one or more controlled numbers and at least one set of call treatment conditions for respective ones of said controlled numbers, when said DN is not a controlled number, and an LRN associated with said DN is not available to said present network entity, routing said call based on said DN, and signaling a value for a parameter to network entities handling said call subsequent to said present network entity, said parameter relating to access to said LNP database in connection with further processing of said call.

34. The method of claim 33, wherein permission is denied to said network entities handling said call subsequent to said present entity when said parameter has a first value, and permission is not denied to said network entities handling said call subsequent to said present entity when said parameter has a second value.

* * * * *